June 18, 1957 C. J. KINSEY 2,795,978
SHIELDING DEVICE

Filed Sept. 29, 1953 2 Sheets-Sheet 1

INVENTOR
Claude J. Kinsey
BY
L.D.Burch
ATTORNEY

June 18, 1957 C. J. KINSEY 2,795,978
SHIELDING DEVICE
Filed Sept. 29, 1953 2 Sheets-Sheet 2
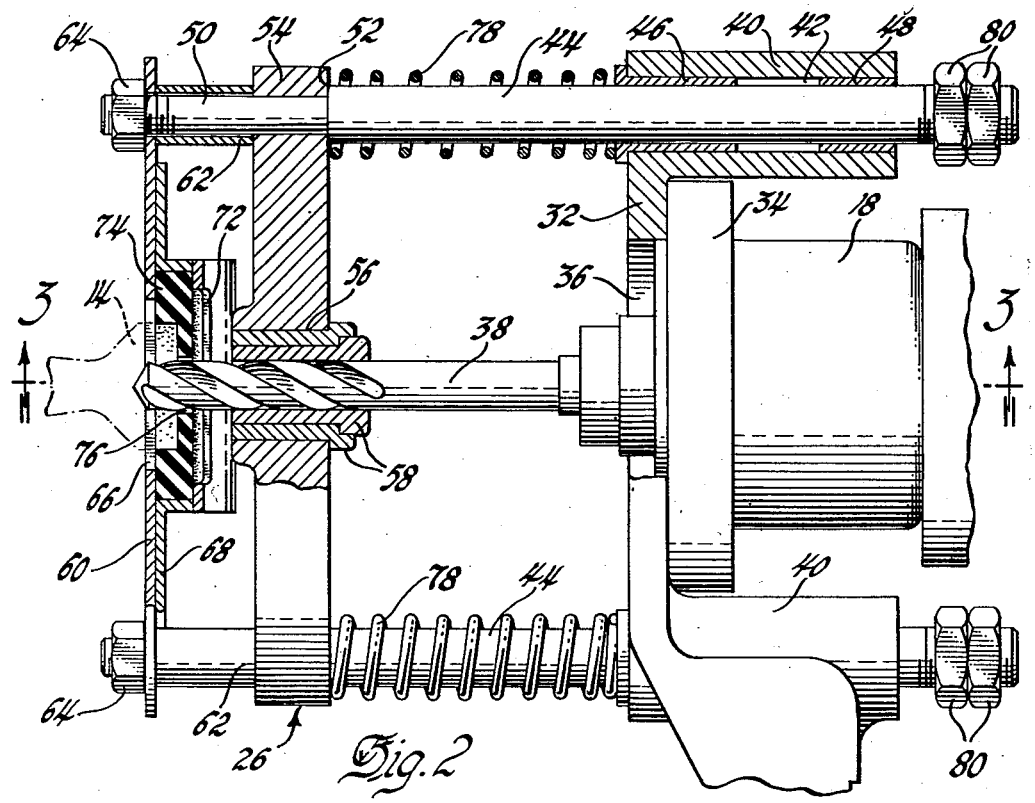
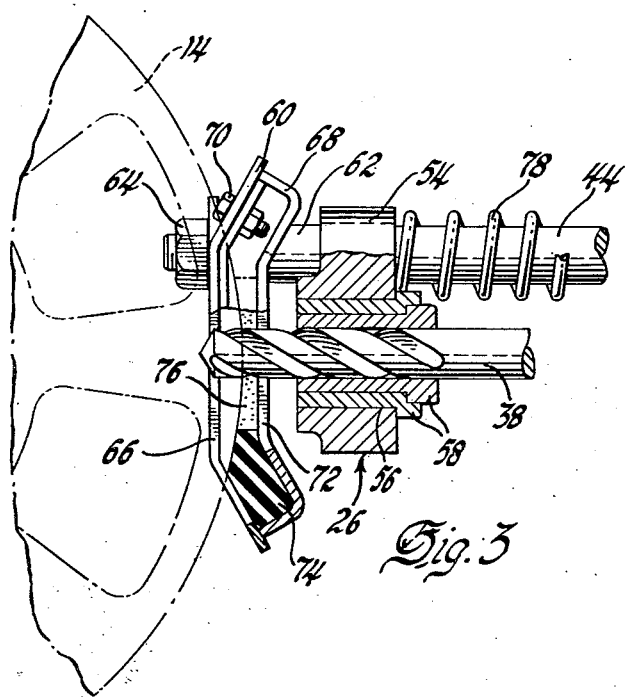
INVENTOR
Claude J. Kinsey
BY
ATTORNEY

United States Patent Office 2,795,978
Patented June 18, 1957

2,795,978

SHIELDING DEVICE

Claude J. Kinsey, Detroit, Mich., assignor to General Motors Corporation, Detroit, Mich., a corporation of Delaware Application September 29, 1953, Serial No. 382,913

1 Claim. (Cl. 77—55)

This invention relates to shielding devices generally and in particular to a guard or shield for use with a metal working machine tool for protecting the workpiece and members adjacent thereto from the abrasive metal chips, shavings, and dust resulting from the use of such a tool.

Of general concern in grinding, milling, drilling and other machine processes where waste products are produced is the collection and removal of such extraneous materials. These waste products endanger the safety of the machine operator, obstruct the working tool, and require protective care of bearings and other elements associated with the workpiece or disposed near the work area. Of particular concern in regard to the latter are instances where it is desired to machine a part of an assembled mechanism. In the final balancing of an engine, for example, where a crankshaft or flywheel mounted in the engine must be drilled to achieve such balance, the bearings, close tolerance metal parts, lubricating passages and the like must be protected against abrasive metallic dust particles. Cutting and cooling fluids which are generally used with metal working tools do, to a certain extent, entrap some of the waste products. However, such contaminated fluids are generally thrown and splattered about carrying the particles with them. Where shielding devices have been used in the past they have not always adequately protected the work area against the abrasive particles but have merely restrained the major portion of the flying chips for the protection of the machine operator, and have only generally caught and controlled the flow of the contaminated fluid.

It is now proposed to provide a shield or guard for association with a working tool which will completely protect the workpiece and associated parts from waste materials and contaminated cutting or cooling fluids incident to a machining operation. It is an object of this invention to provide a guard adapted to be placed in engagement with a workpiece and through which a cutting tool may be projected. The force of the machine tool brought to bear against the workpiece is adapted to assist in holding the guard in engagement with the workpiece. The waste materials and cooling fluids are caused to fall behind the guard where they may be easily collected and carried away from the operating area. The shielding device comprises a yieldable member adapted to conform to the contours of the workpiece and to prevent the escape of waste materials and cooling fluids from other than behind the guard.

The shielding device is adapted to be associated with the machine tool and to be engaged firmly against the workpiece prior to the machining operation. The guard is held in secure engagement against the workpiece during the entire work period and is not removed until the machining operation is completed. The proposed guard may be used in a stationary machine operation as in drilling or in a moving operation as in milling since the guard is a part of the machine tool and is at all time engaged with the workpiece during the machining operation.

Figure 2 is a fragmentary view of the machine tool having the proposed shielding device secured thereto. Figure 2 is taken in the plane of line 2—2 of Figure 1 and is partially broken away and shown in cross-section.

Figure 3 is a fragmentary view of a part of the shielding device taken in the plane of line 3—3 of Figure 2 and viewed in the direction of the arrows thereon.

Figure 1:
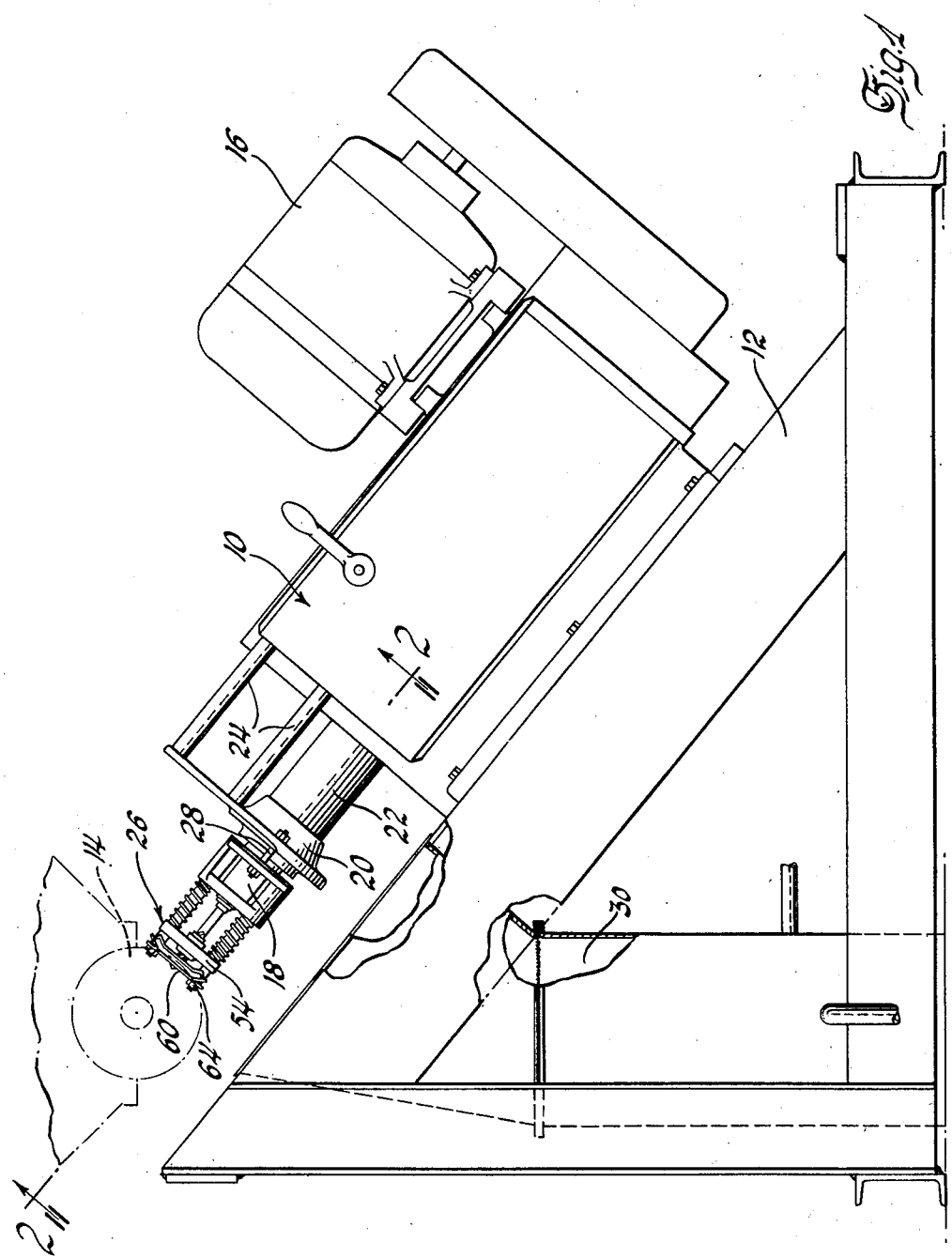
Figure 1 is a side view of a hydraulically controlled machine tool having the proposed invention associated therewith and mounted on a framework inclined towards a workpiece.

A metal working machine tool, such as a drilling machine 10, is mounted upon a supporting framework 12 and is disposed in an inclined position towards a workpiece 14. The drilling machine comprises a hydraulic ram system operated by a motor 16 and has a drill device 18 secured to a collar 20 mounted on an axially movable support column 22. The drill device 18 is moved towards the workpiece 14 and returned by hydraulic actuation of the shafts 24 which are secured to the collar 20 and adapted to impart axial movement to the support column 22. A work shield or guard 26 embodying the principles of this invention is associated with the drill device 18 and is secured to the collar 20 by tie rods or similar means 28. Disposed within the framework 12 supporting the machine 10 and below the workpiece 14 is a container or bin 30 for collecting drill chips and shavings.

The work shield or guard 26 comprises a base plate 32 adapted to seat against the face plate 34 of the drill device 18. An aperture or opening 36 is provided centrally through the base plate 34 to allow for the projection of the drill shank 38 towards the workpiece 14. Formed within the base plate 34 on opposite sides of the drill device 18 are rearwardly extending cylindrical guide members 40 having a guide passage 42 formed therethrough. Guide rods 44 are received within bushings 46 and 48 fitted within the guide passages 42, and extend parallel to the drill shank 38 and in the same direction. The outer ends 50 of the guide rods 44 are undercut to provide a shoulder 52 for receiving a drill guide 54. The drill guide 54 extends between the two guide rods 44 and has an aperture 56 formed centrally therein through which the drill shank 38 is received. Bushing inserts 58 are secured within the aperture 56 to center the drill shank 38 and are changeable to conform to different size drills.

A face plate 60 is mounted between the guide rods 44 on their outer ends 50 and is held in spaced relation to the drill guide 54 by spacers 62. The face plate 60 and drill guide 54 are secured to the guide rods by nuts 64 threaded on the ends of the guide rods to hold the plate, spacers, and guide against the shoulder 52. An opening 66 is formed through the face plate 60 in axial alignment with the aperture 56 of the drill guide 54. A holder 68 is secured to the back of the face plate 60 by fastening means 70. The holder has an opening 72 formed therethrough also in axial alignment with the drill guide aperture 56. The holder 68 is adapted to retain a yieldable and resilient member 74 against the face plate and behind the opening 66. A drill passage 76 is formed through the member 74 and is aligned to receive the drill shank 38.

The face plate 60 and drill guide 54, with their associated elements, are axially movable with respect to the drill shank 38 by slidably moving the guide rods 44 within the guide passages 42. Disposed about the guide rods 44 between the base plate 32 and the drill guide 54 are coil springs 78. The springs 78 are mounted in compression to hold the face plate 60 in an extended position beyond the end of the drill shank 38. Threaded to the ends of the guide rods 44 on the other side of the base plate 32 are nuts 80 adapted to provide a stop against forward movement of the guide rods.

In operation the work shield 26 is secured to the drill device 18 and the drilling machine 10 is placed in operation. The hydraulic ram system acting through shafts 24 moves the drill device 18 and work shield 26 towards the workpiece 14. The face plate 60 approaches the workpiece 14 and the yieldably resilient member 74 is engaged thereagainst. The member 74 is adapted to conform to the workpiece contour providing a sealing effect about the area to be drilled. The drill device 18 is moved further forward causing the base plate 32 to compress the coil springs 78. Since the engagement of the member 74 with the workpiece restrains further forward movement of the face plate 60, there is a resulting rearward relative movement of the drill guide 54 and face plate 60 with respect to the drill shank 38. The drill 38 is thus moved through the drill passage 76 provided in the member 74 and is adapted to drill within the sealed-off work area. Drill chips are caused to flow back through the drill passage 76 and to fall behind the face plate 34 and into the collection bin 30.

I claim:

Shield and guide means for use with a work tool and which includes a work tool guide, means for connecting said work tool guide near the end of a work tool and in spaced relatively movable relation thereto, and a shielding member secured in fixed spaced relation to said work tool guide and relatively movable therewith with respect to said work tool, said shielding device including a face plate having an aperture provided therein for receiving a complementary part of a workpiece, a resilient member secured behind said face plate and across said aperture for engaging and sealing from exposure an area of said workpiece received through said face plate, and an access to said area provided through the back of said resilient member for receiving said tool for working said workpiece, said face plate protecting said resilient member, said resilient member protecting said workpiece, and said guide being disposed sufficiently apart from said shielding device to be protected from work debris from said workpiece.

References Cited in the file of this patent
UNITED STATES PATENTS

| | | |
|---|---|---|
| 1,519,952 | Brown | Dec. 16, 1924 |
| 2,360,942 | Ellerstein | Oct. 24, 1944 |
| 2,426,124 | Skwierawski | Aug. 19, 1947 |